(12) United States Patent
Reus et al.

(10) Patent No.: US 7,702,756 B2
(45) Date of Patent: Apr. 20, 2010

(54) NUMEROUSITY AND LATENCY DRIVEN DYNAMIC COMPUTER GROUPING

(75) Inventors: Edward F. Reus, Woodinville, WA (US); Michael David Alan Zoran, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1654 days.

(21) Appl. No.: 10/789,278

(22) Filed: Feb. 27, 2004

(65) Prior Publication Data

US 2005/0193099 A1 Sep. 1, 2005

(51) Int. Cl.
*G06F 15/177* (2006.01)
(52) U.S. Cl. .................. 709/220; 370/331; 455/436
(58) Field of Classification Search .......... 709/204, 709/225; 707/1; 455/418; 370/338, 390, 370/331
See application file for complete search history.

(56) References Cited

U.S. PATENT DOCUMENTS

| | | | | |
|---|---|---|---|---|
| 7,031,288 | B2 * | 4/2006 | Ogier | 370/338 |
| 7,116,661 | B2 * | 10/2006 | Patton | 370/390 |
| 7,302,256 | B1 * | 11/2007 | O'Hara et al. | 455/418 |
| 2002/0184310 | A1 * | 12/2002 | Traversat et al. | 709/204 |
| 2004/0243672 | A1 * | 12/2004 | Markki et al. | 709/204 |
| 2005/0050004 | A1 * | 3/2005 | Sheu et al. | 707/1 |
| 2005/0060406 | A1 * | 3/2005 | Zhang et al. | 709/225 |

OTHER PUBLICATIONS

Eunsoo Shim, Richard D. Gitlin; "NeighborCasting: A Fast Handoff Mechanism in Wireless IP Using Neighboring Foreign Agent Information"; Jan. 15, 2001; Columbia University; Mobicom; 15 pages.*
Ensoo Shim, Hung-yu Wei, Yusun Chang, and Richard D. Gitlin; "Low Latency Handoff for Wireless IP QOS with NeighborCasting"; 2002; Columbia University; IEEE; 4 pages. (Month Unknown).*
Sylvia Ratnasamy, Mark Handley, Richard Karp, Scott Shenker, "Topologically-Aware Overlay Construction and Server Selection", IEEE Infocom, 2002, 10 pages.*
Backweb Prior Art, Apr. 6, 2004, retrieved from <http://www.backweb.com>.

* cited by examiner

*Primary Examiner*—Dustin Nguyen
(74) *Attorney, Agent, or Firm*—Lee & Hayes, PLLC

(57) ABSTRACT

In a domain containing one of many computing devices, the computing device transmits a query and receives back a response from one or more neighbor-casting groups in the domain each including one or more of the computing devices. Predetermined criteria are applied by the computing device to select one of the groups to which it is joined as a group member. The predetermined criteria can be the number of computing devices in the selected group, a length of time between the query and the response from the selected group, or a combination of thereof. When the selected group has few computing devices, the computing device can send a query and receive back a response from one or more groups. By applying criteria similar to the predetermined criteria, the computing device can select one other group, remove itself from its current group, and join the other selected group.

38 Claims, 8 Drawing Sheets

NUMEROUSITY AND LATENCY DRIVEN DYNAMIC COMPUTER GROUPING

TECHNICAL FIELD

This invention relates to the computing devices in a domain, and more particularly to grouping computing devices in a network into subgroups.

BACKGROUND

A domain or other large network environment can have hundreds or thousands of related computing devices, each of which has some element of trust for the other related computing devices. As used herein, a domain includes a collection of computing devices that share a common domain database and security policy, where each domain has a unique name. It is useful to divide up the computing devices into smaller, manageable groups. These groups can be useful for system management, for deploying applications or data across hundreds or thousands of related computing devices in the domain, and for distributing computing problems among related computing devices in the groups.

The efficiency of dividing related computing devices into groups can be seen through examples. An application or data can be distributed to one related computing device in a group so that it can share its locally cached files with other related computing devices across the group, such as within a local network. Thus, a group can serve as a related computing device-based caching system. The caching system of the group allows application, data, and data processing tasks to be delivered in a peer-to-peer fashion between related computing devices within the group. For example, when a document needs to be distributed to thousands of users, the first related computing device to receive this document in a group is then able to serve it to other related computing devices in its group. Once other related computing devices receive the file, they can then serve the file to additional related computing devices in the group that are requesting it. As the number of related computing devices in a group that are able to serve others eventually expands, the document will be delivered faster without overwhelming the network or any single related computing device.

In another example where a related computing device can cache content for multiple users on the same Local Area Network (LAN), a series of video files may need to be sent to multiple users in a satellite office. By using one related computing device in a group to first retrieve the series of video files from a corporate server, and then distributing the series of video files in a peer-to-peer model (or using a group cache of the video files) within the group, there will be a significant reduction in the amount of Wide Area Network (WAN) traffic to the satellite office with the corporate server. As such, this kind of efficient distribution protects WAN bandwidth by delivering content to a group once, and allowing other employees to get the content from any related computing device on the LAN in a peer-to-peer fashion. Thus, the content only needs to cross the corporate server firewall and travel the WAN once and is distributed efficiently within the LAN in the satellite office(s). Note that any related computing device on the LAN can receive data, software, or a computing task either from the corporate backbone (e.g., corporate servers) on the WAN, or from any neighboring related computing device in the group from the LAN via peer-to-peer networking.

Since any one group can be configured to have a relatively small membership in a "peer-casting" application, the original related computing device that first receives an application is not overwhelmed with requests from its group peers and as more of the peers receive the application, other peers in the group can go to any group member that already has the application to get their own copy. Further, the load on the original corporate server is significantly reduced since the number of related computing devices that the original corporate server must directly communicate with is significantly reduced.

In some environments it may be easy to define a peer-casting group within which related computing devices can share data, software, and computing tasks. For example, if there are only a few 'close by' related computing devices, then specifying these related computing devices as being in a single group is a fairly easy chore for a system or network administrator. In a domain or other large network environment, however, there may be hundreds or thousands of related computing devices such that it may be all but impossible to directly create and manage these groups. A problem exists in that related computing devices are not dynamically formed into groups, and groups of related computing devices are not maintained automatically. Rather, intervention by a system or network administrator is required. It would be an advance in the art to dynamically create and manage groupings of related computing devices within a domain without requiring the attention of a system or network administrator.

SUMMARY

According to one exemplary implementation, a method is described for a domain containing one of many computing devices. The computing device transmits a query and receives back a response from one or more neighbor-casting (NC) groups in the domain. Each NC group includes one or more of the computing devices. The computing device applies predetermined criteria to select one of the NC groups. After the selection is made, the computing device is joined to the selected NC group, such as by association with a unique NC group identifier. The predetermined criteria can be the number of computing devices in the selected NC group (e.g., numerousity), a length of time between the query and the response from the selected NC group (e.g., latency), or a combination of thereof. In another exemplary implementation, when the selected group has few computing devices, the computing device can send a query and receive back a response from one or more groups. By applying criteria similar to the predetermined criteria, the computing device can select one other group, remove itself from its current group, and join the other selected group.

Exemplary implementations allow a computing device to dynamically group itself with other computing devices, to dynamically manage NC groups with which the computing device is in communication, as well as to remove itself from an NC group.

Figure 1:
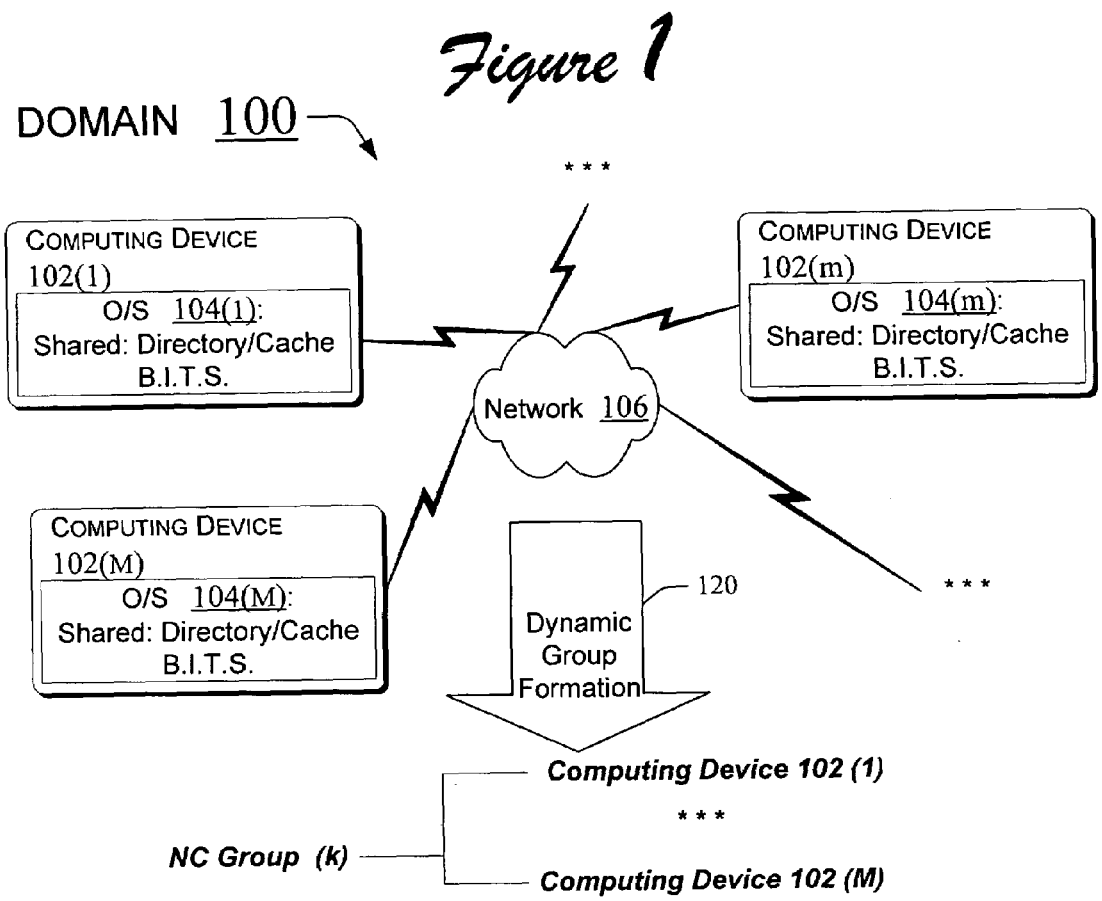
FIG. 1 shows an exemplary environment in which a plurality of related computing devices are dynamically formed into a neighbor casting group, each of which can be one of a variety of difference kinds of computing devices.
Figure 1:
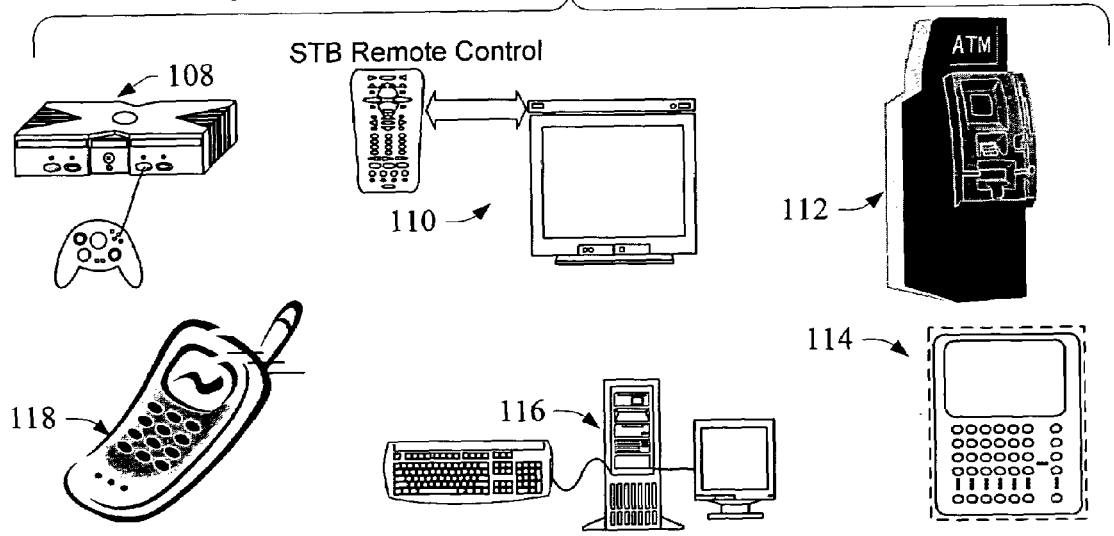

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure pertains to the dynamic grouping together of related computing devices in a domain, and managing the groups. Applicable domains can have hundred or thousands of related computing devices, although the present disclosure is equally applicable to domains having a significantly fewer number of related computing devices. This grouping is dynamic in that groups of related computing devices in the domain are created and managed without intervention by a system or network administrator. The dynamic creation and management of groups is driven by predetermined criteria as to the number of related computing devices that can be within a group and/or is driven by predetermined criteria as to acceptable latency in response times between related computing devices within a group.

In order to dynamically create groups, a related computing device should have the ability to discover neighboring groups (if any) that already exists in the domain. Once the NC groups are discovered, an appropriate criteria can be applied in order to select which of the existing neighboring groups (Neighbor-Casting (NC) groups) are appropriate. Once one or more NC groups have been dynamically created, they should be automatically managed so that no NC group grows inappropriately large, and so that group membership can be automatically maintained as related computing devices are added to and removed from the domain and/or from a local area network over time.

The dynamic creation and management of NC groups is regulated by predetermined criteria that defines constraints that are put on the NC groups. Once such constraint is a minimum size criterion (e.g., numerousity) that dictates how small an NC group should be (e.g., a minimum number of related computing devices that are to be in one NC group). This number need not be mandatory, but may be discretionary in that a group may be permitted to be smaller, but groups should be at least the specified size. As such, NC groups that are smaller than this number will be managed so that attempts will be made to try to join it with larger groups, if scrutiny of the predetermined criteria deems that they can. For example for small NC groups, a minimum size criterion may be a default minimum of three related computing devices. Another constraint on an NC group is a maximum size criterion that dictates how large the NC group should be (e.g., a maximum number of related computing devices that are to be in one NC group).

Still another constraint on NC groups is a response timeout criterion (e.g., latency). The response timeout criterion that dictates the longest acceptable length of time that a related computing device will wait for a reply from any NC group. The reply is requested when the related computing device transmits a query for existing NC groups and that related computing device is being managed to try to join an NC group. After the expiration of the response timeout criteria, any additional replies are cut off. For example, if an NC group replies after the length of time specified by the response timeout criteria, then that NC group is most likely "too far" away, in network terms of the latency of the response. The response timeout criteria can be a value that is chosen such that an NC group will not span a modem or a Cable/Digital Subscriber Line (DSL) connection (i.e., if set to less that 10 milliseconds, then this values will likely exclude any connection that spans Cable/DSL lines).

Yet another constraint on NC groups is a retirement timeout criteria that dictates the longest time that a group member can disappear (not communicate with any other group member) before other members of a group automatically remove that member from the group. A further constraint on NC groups is a maximum response criterion that dictates the maximum amount of time that members within a group should require in communicating with each other. If a related computing device is moved, it may no longer be close enough for an acceptable latency in its responses and therefore would no longer be an acceptably close neighbor. In this case, it would be more efficient to have the related computing device automatically leave its existing group and join a closer group (e.g., automatically form a new group).

The groups being formed as described in this specification are composed of related computing devices that are in the same domain. As such, related computing devices in each group that is to be formed already have an established trust relationship. While the established trust relationship need not be a full trust relationship, the trust should be sufficient such that non-members of the domain can be excluded from joining a group. Additionally, the creation and management of groups should include criteria that prevent a mistaken joining of a related computing device in a domain into a group with one or more computing devices that are not in the domain.

The forgoing constraints can be used to dynamically create multiple peer-casting groups from larger groups of related computing devices in a domain. In further explanation, this disclosure is organized as follows: Section A of this disclosure describes exemplary implementations of exemplary environments for creating and managing groups of related computing devices in a domain. Section B describes exemplary implementations of exemplary processes to create and manage groups of related computing devices in a domain, and Section C describes both an exemplary related computing device and an exemplary computing environment that can be used to provide the exemplary implementations described in Sections A and B.

A. Environments for Creating and Managing Groups

An exemplary environment is seen in FIG. 1 as a domain 100 in which there can be a dynamic formation of a group of related computing devices 102(1-M) that are in the same domain 100. Each related computing device 102 is in communication with a network (106) such as a Local Area Network (LAN). An operating system (O/S) 104 is included in each related computing device 102. O/S 104 can include a shared directory. Once a plurality of related computing devices 102 have been dynamically formed into a group, they can communicate as a group. One such form of communication can include the sharing of cache. The contents of the cache that is shared among the group can include software that is be distributed among the group, data that is to be distributed among the group, and data processing tasks that are to be distributed for computing by one or more members of the group. A full or partial directory of contents of the cache can be included in, or be separate from, O/S 104 in each related computing device 102.

The logic for creating and managing groups of related computing devices 102(m) in a domain may reside in O/S 104, but may also be fully or partially a standalone application. In one implementation, predetermined criteria for dynamically forming and managing groups can be a component of a Background Intelligent Transfer Service (BITS). BITS can be an aspect of O/S 104 that is used, for instance, by Software Management Services (SMS). SMS is an application outside the O/S 104 that is used to deploy, uninstall, and/or manage software updates (e.g., such as security patched and updates) for the related computing device 102. The efficiency realized by dynamic group formation and management is that these tasks can be accomplished without intervention by a network or system administrator. Dynamic grouping aspects of BITS can be enabled or disabled and may or may not be exposed for use by third parties as part of O/S 104 or as part of a standalone application.

A dynamic group formation process 120 forms an NC group (k) from related computing device 102(1) through related computing device 102(M) via communications over network 106. Note that the present disclosure anticipates that there is a wide variety of types and kinds of related computing devices 102, examples of which are depicted as being a video game console 108, a set top box 110, an automatic teller machine 112, a Personal Digital Assistant (PDA) 114, a Personal Computer (PC), 116, a cellular telephone 118, etc. The related computing device 102 can also be a peripheral computing device (a printer, facsimile machine, copier, or multifunction peripheral device) or a server.

Figure 2:
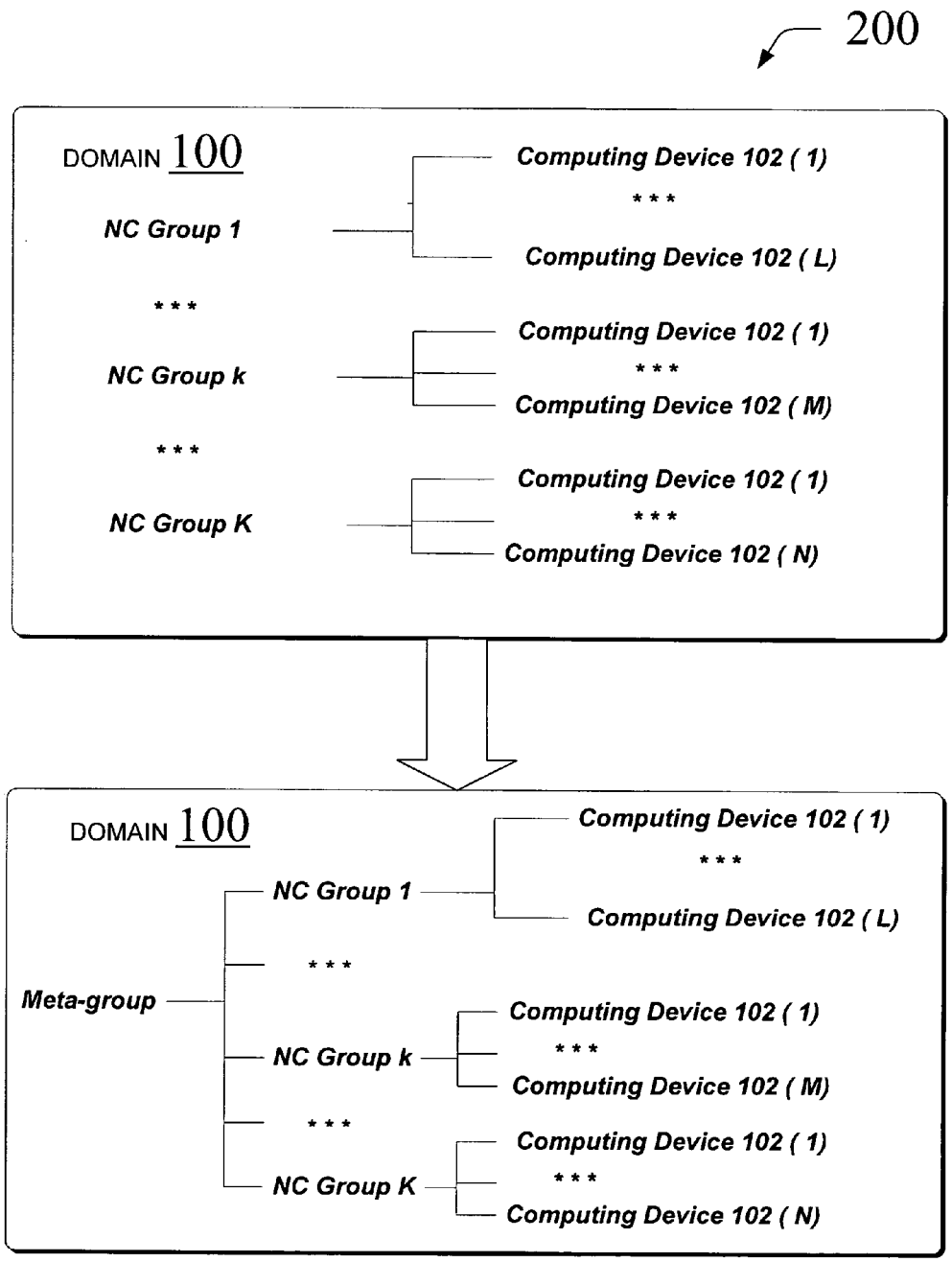
FIG. 2 shows an exemplary environment in which a meta group is dynamically formed from other neighbor casting groups, including the neighbor casting group dynamically formed as seen in FIG. 1.
Figure 3:
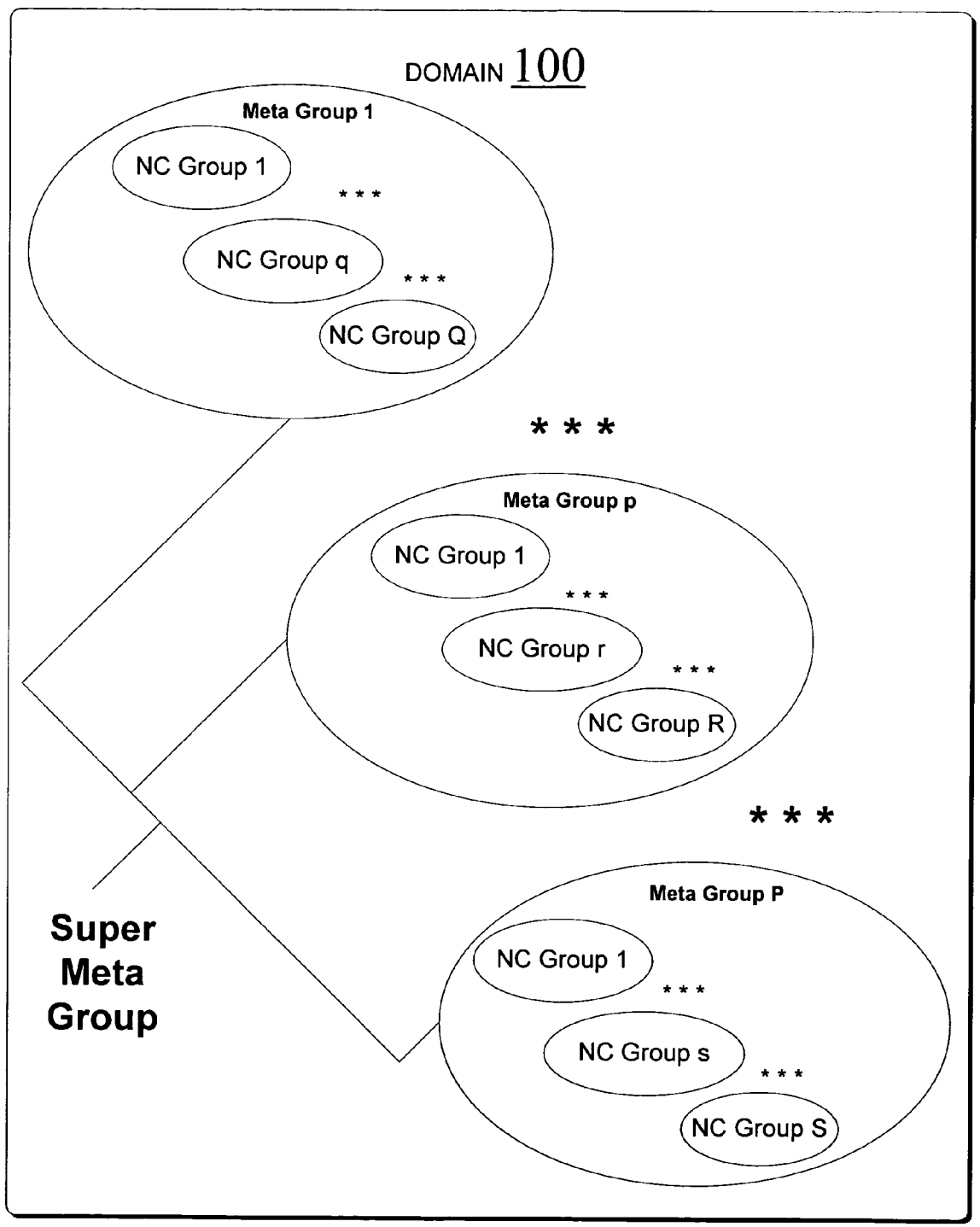
FIG. 3 shows a super meta group that has been dynamically formed from a plurality of meta groups.

Once NC groups have been formed, they can be dynamically grouped together in a likewise manner into meta groups (and so on) to form groups of groups. Accordingly, domain 100 is also seen in FIG. 2 which features NC group (1) through NC group (K), where each NC group (k) is dynamically formed into a meta group. Further, any meta group that is dynamically formed as shown in FIG. 2 can be dynamically joined with still other meta groups in domain 100 to form a super meta group. As shown in FIG. 3, a meta group (1) includes NC groups 1-Q, a meta group (p) includes NC groups 1-R, and a meta group (P) includes NC groups 1-S. As such, a super meta group is dynamically created from meta groups (1-P). As an alternative to defining the foregoing three (3) levels of groups, groups and meta-groups can be contained within other meta-groups, and the grouping can be any number of levels.

Given the foregoing explanation of FIGS. 1-3, each member in an NC group can be assigned a globally unique group ID (GUID). Each group, for instance, may be constrained to have 7-15 related computing devices that are relatively close together, in terms of response time, for efficient intra-group communications. Because excessive latency is inefficient, response time is measured to determine a member's closeness and whether a member should be removed from a group. Though a member's response time is tolerable, the member might still be removed in favor of joining that member to a different group to which it will respond to more quickly, or in favor of joining that member to group that is not as process intensive (e.g., not as busy) as its present group.

In sum, each group in the domain has at least one related computing device and each of the groups, meta groups, and super meta groups can have a GUID to uniquely identify itself with. Each related computing device can be a node on a logical hierarchical tree structure representing a group, meta group, and/or super meta group. Once groups have been dynamically created, the related computing devices in the groups treat each other as neighbors so that they can do neighbor-casting of data, software, and computing tasks.

B. Processes for Creating and Managing Groups

Figure 4:
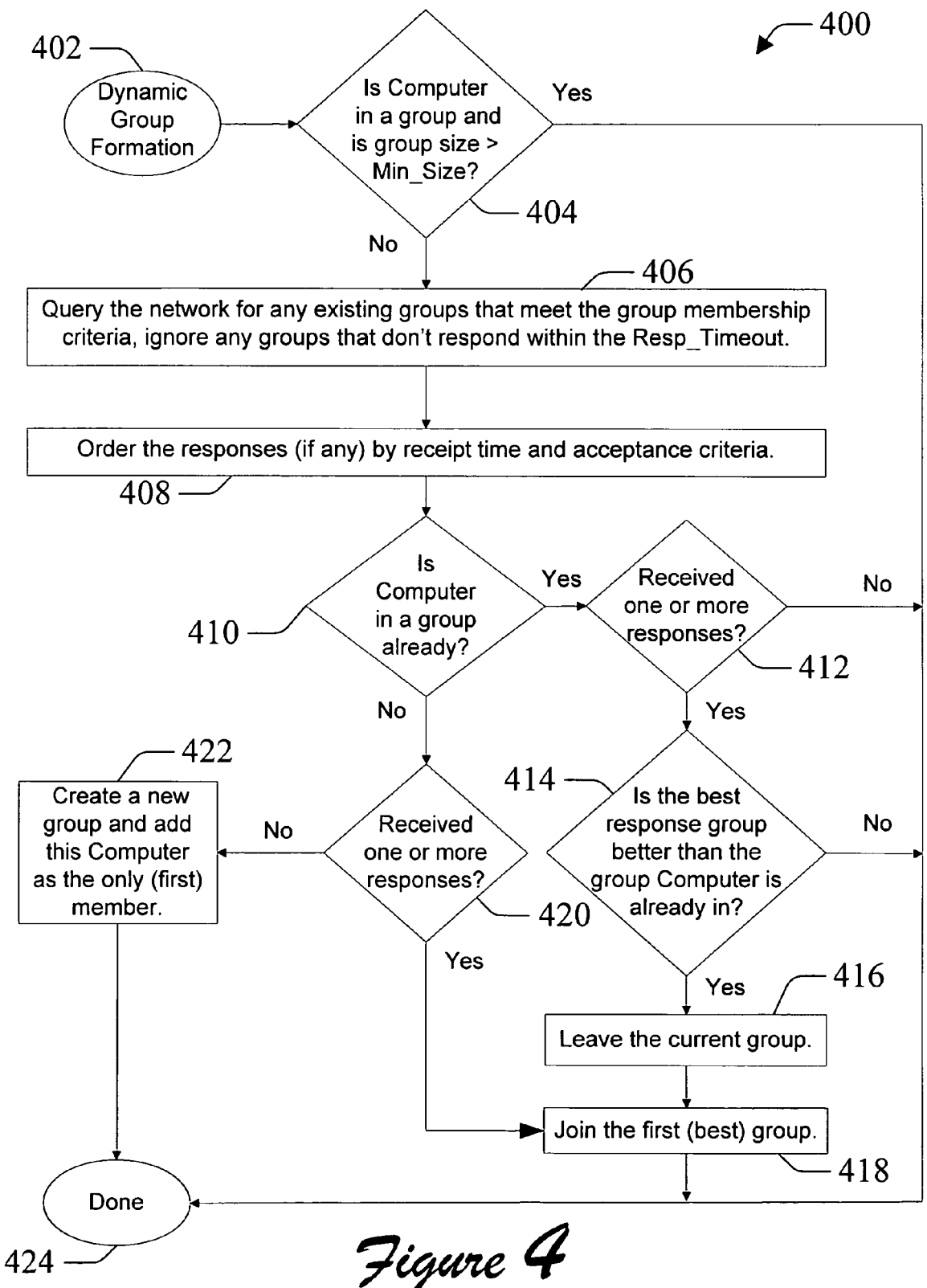
FIG. 4 illustrates an exemplary process for dynamically creating multiple peer-casting groups from larger groups of related computing devices in a domain.

An exemplary process 400 is seen in FIG. 4 according to one implementation that can be used to dynamically create multiple peer-casting groups from larger groups of related computing devices in a domain. Process 400 is executed by a related computing device upon which an examination is made though communications received by and sent from the related computing device presently being examined. A dynamic group formation implementation of process 400 begins at block 402 and moves to a query 404. Query 404 determines whether the related computing device (e.g., a computer) is presently in a peer-casting group (i.e., NC group) already. If so, query 404 also determines whether the NC group has more than a predetermined minimum size of members. If both answers are in the affirmative, then process 400 terminates at block 424. Otherwise, control of process 400 moves to a block 406.

At block 406, a determination is made on the network as to what groups currently exist. For TCP networks, this can be accomplished with a broadcast/multicast of a group query packet (which transmission can usually be made just to the subnet), and then 'listening' for responses within a predetermined timeout length of time. For queries to discover other existing groups in the domain; it may be possible to use SSDP (Simple Service Discovery Protocol) in order for a new computing device to query for existing groups in the domain. The responses to the query can include information about joining the group, the number of current members in the group, as well as any additional group information that can be used to determine membership applicability (e.g., the GUID of the group). Further, the response can be signed with credentials such that it can be known that the responder is part of the same domain (i.e., that the response has an acceptable level of trust), or both sides of the response can be authenticated at block 418, discussed below.

After block 406, process 400 passes control to a block 408 at which the responses are ordered according to the closest (least response time) and smallest (least number of related computing devices) group. Note that if two groups have the same response time then process 400 can be configured such that the first smaller group will be selected. The groups can also be ordered by other group membership criteria as well, such as how busy the members of the group are or by how much availability of machine resources exist for the group. For example, a group with low computer utilization may be a better group to join even if that group has more members than another group that has higher computer utilization of its members. Additional joining criteria can be pre-configured into process 400

After block 408, process 400 passes control to a query 410. Query 410 determines whether the related computing device presently being examined is in a group already. If so, the process 400 move to a query 412. If not, then process 400 passes control to block 420.

At query 420, it is determined whether one or more responses were received from existing groups. If so, the process 400 moves on to a block 418 at which the related computing device is joined to the first and best group as determined by the ordering at block 408. In the process of joining the NC group at block 418, the computing device presently being examined and the group sought to be joined can authenticate each other in order to exclude untrusted computing devices from group membership. If, however, it is determined by query 420 that no responses have been received, then process 400 moves to block 422 at which a new group is created having only the related computing device presently being examined as its sole member. After block 422, process 400 terminates at block 424.

At query 412, it is determined whether one or more responses had been received from existing groups. If so, then process 400 proceeds to a query 414. If, however, no responses were received, then process 400 terminates at block 424. Query 414 determines whether the best response that was received was from a group that would be better for the related computing device presently being examined that its current NC group. If so, then process 400 moves to block 416 so that the related computing device presently being examined can leave the current group and joining the better group at block 418. Otherwise, process 400 terminates at block 424.

Figure 5:
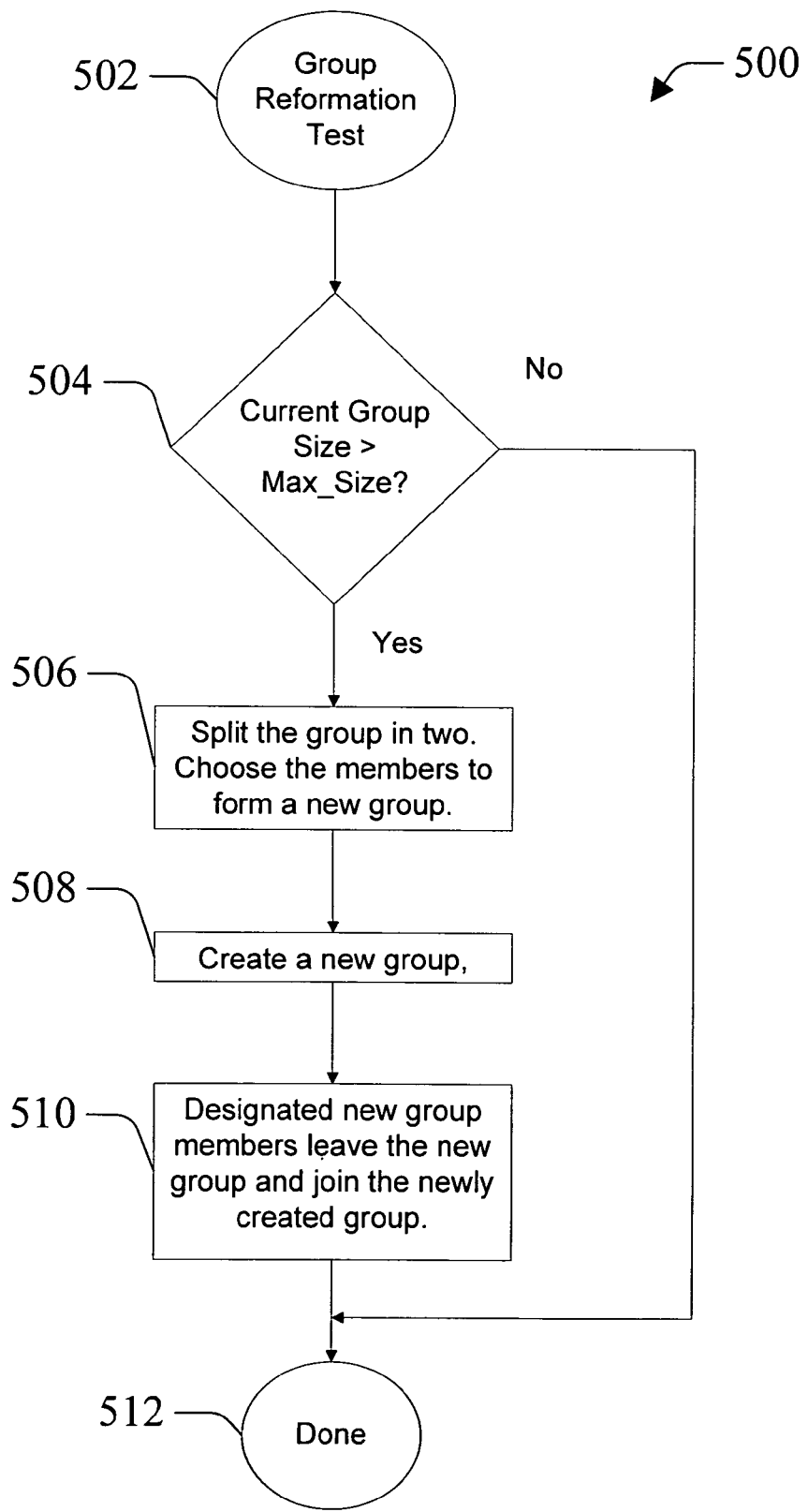
FIG. 5 illustrates an exemplary group reformation process for when a related computing device joins an existing group and a test is needed to see if the existing group is larger than a predetermined group size criteria.

Block 418 of process 400 allows a related computing device to join an existing group. If the group is joined at block 418, then the group can be tested to see if the number of members in the group exceeds a predetermined maximum size. An exemplary process 500 for this test is seen in FIG. 5 that begins at block 502 and proceeds to a query 504. Query 504 determines whether the current group membership is greater than the predetermined maximum size. If not then process 500 terminates at block 512. If query 404 is affirmative, then the group is to be spit up and process 400 moves to block 506.

At block 506, one half of the members in the group are selected to stay in the existing group and one half are selected to form a new separate group. There are, however, several ways to split the group membership. For example, one way is to randomly choose one half the members, and another is to use a predetermined criteria. For example, members can be broken into two groups based on their observed response times within the group (i.e., network distance). Additionally, members that are in the process of inviting another related computing device into the group, such as through communication of responses to queries from other related computing devices outside the group, can stay in the existing group. An alternative is to define an optimum size membership for the number of members in a group, which size may not be the same as one-half (½) the predetermined maximum group size, and then split the group into a group having the optimum size membership—thus leaving the remaining members to make up the other group.

After the selection of group members has been made at block 506, process 500 moves to block 508 at which a new group is created for the members selected to leave the existing group. One of the new group members can randomly be selected, for instance, to create the group. A block 510 follows block 508 at which each of the members selected for the new group leaves the existing group and joins the newly created group. Process 500 then terminates at block 512. Process 500 will effectively manage dynamic group formation and will effectively subdivide the domain into groups of approximately the predetermined maximum group size (or less). Groups, in essence, are able to self manage themselves over time.

Figure 6:
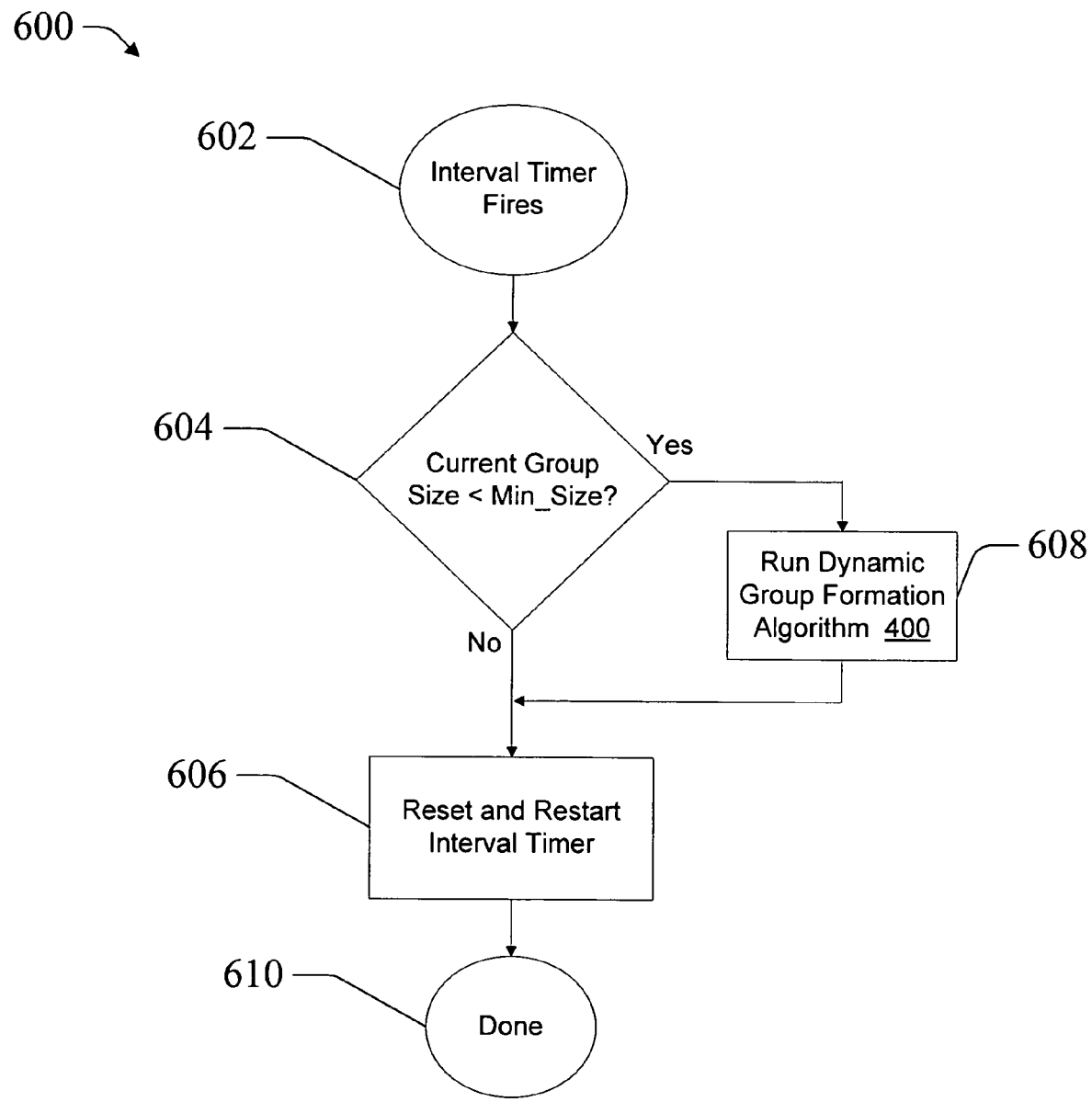
FIG. 6 illustrates an exemplary process for determining whether a related computing device is in a group all by itself, or whether the number of related computing devices in the group is below predetermined minimum, and if so then an attempt is made at regular intervals to rejoin another more acceptable group by sending out a query transmission, and if a new group is found, then the current group will leave and join the new group.
Figure 7:
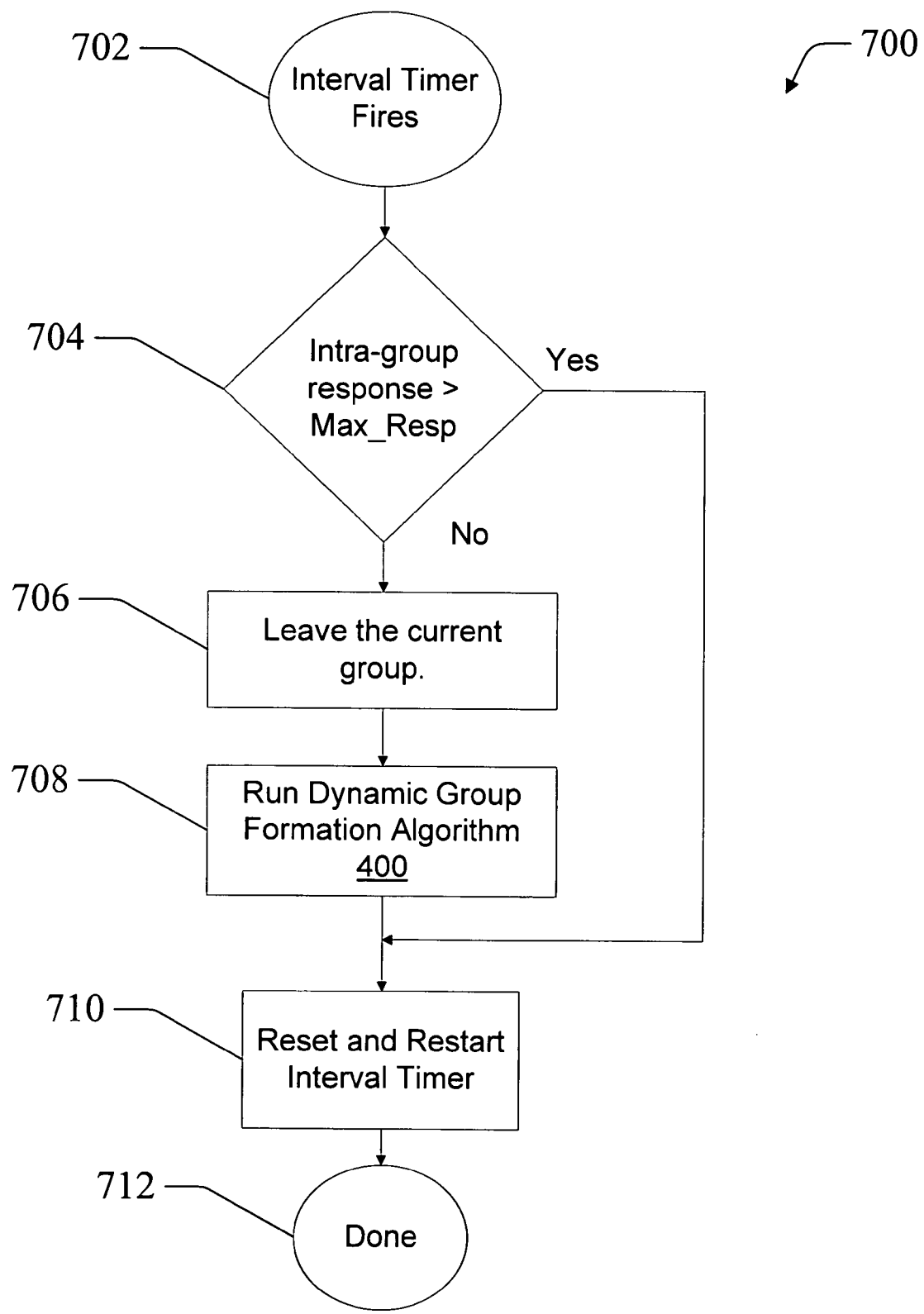
FIG. 7 illustrates an exemplary process for discovering whether a related computing device has been moved such that it is no longer close to other members of its group in network terms of response time, and if so discovered then that related computing device can leave the current group and then try to join another better matching group by using, for example, the exemplary process illustrated in FIG. 6.

FIGS. 6-7 represent implementations of exemplary processes that can be run periodically (for example, once a day or every few days) to maintain groups, such as by measuring time with an interval timer operating in a related computing device that is a member of a group. As such, FIG. 6 is a flowchart for a process 600 that begins at block 602 when an interval timer signals the periodic execution. If the related computing device presently being examined is a member of a group all by itself, or the number of members in the group is below a predetermined minimum group membership size (e.g., numerousity) as per a query 604, then the single member or small number of members will try to rejoin another more acceptable group at regular intervals, such as by using process 400 as seen in FIG. 4. Such an attempt can be made by sending out a group query packet. If a new group is found, then the single member or small number of members will leave the current group and join the new one. If the group size is within a predetermined tolerance, process 600 moves from query 604 to block 606 at which the interval timer is reset and restarted. Process 600 then terminates at block 610.

At FIG. 7, a process 700 determines whether a related computing device has been moved with respect to its group. Process 700 can be configured to begin at block 702 when an interval timer signals a periodic execution of process 700. If the related computing device has been moved and is no longer close to the other members of its group, as measured by the group's response time to the related computing device at a query 704, then the related computing device can leave the current group at block 706 and try to re-join another better matching group by rerunning a group formation algorithm at block 708, such as by using process 400 as seen in FIG. 4. This can be accomplished by monitoring the response times of intra-group communications. If the response times lengthen beyond a predetermined maximum length of time and do not recover (i.e., excluding transient networking issues), then it may be assumed that the related computing device has moved to a new location. After block 708 or an affirmative response to query 704, process 700 moves to block 710 at which the interval timer is reset and restarted. Process 700 then terminates at block 712.

As discussed above, latency in a response time can be indicative of the 'closeness' of related computing devices. Related computing devices are isolated if they have slow links, thereby preventing spanning both a local site and a remote site. When a related computing device is looking to join a group and any reply follows a query for existing groups that exceeds a maximum time period (e.g., more than 10 milliseconds for the example of DSL), this latency in the response may be an indication that there is a spanning of a modem or of a Cable/DSL connection, or other wide area network connection. By excluding members from groups on the basis of a long response time, network bandwidth usage is made more efficient than otherwise.

If a related computing device "disappears" from a network for an extended time, in that no communication is made with the related computing device, then the related computing device can be removed from the group by the other members. For example, if a related computing device is retired, sold, turned off, or is manually removed from a group, then after a predetermined retire timeout length of time, the related computing device will be automatically removed by the other group members. If a related computing device is turned off for an extended time greater than the predetermined retire timeout length of time, then when the related computing device is turned back on, the related computing device will no longer be a member of the group it originally joined and will need to rerun a group formation algorithm, such as by using process 400.

A group of related computing devices can have a shared group cache of information or data and a shared database directory of what is in the shared group cache. These are used by the peers (e.g., members) in a group. A shared directory is a database that can be on each peer or in different pieces spread out over peers in the group. This database serves as a library to answer queries that find out what other peers in the group have and do not have, thus reducing data replication within the group, yet expanding intra-group network traffic (e.g., peer chit chat). One peer that needs data/software/parallel process computing can know, via the shared directory, that another is now downloading what it needs so that it will forebear getting its needs and wait until its peer has the needed download before requesting it. As such, peers in a group can share information about what is available by using a shared database directory of what is available on each peer in the group. Thus, each peer will check with the group for a needed download before going out of the group for it. As a needed download is distributed within the group, one peer might have a choice of several locations within the group to choose as a download source. This choice can be made randomly. The information can flow through the group by checking the shared directory and then spreading the load of responding to requests for downloads if more than one peer has the needed download. The shared database directory can also keep information as to whether a peer is now active or is now being accessed so that requests for downloads are sent only to peers that are neither busy nor active.

Implementations presented herein enable dynamic creation and maintenance of groups of related computing devices in a domain. These implementations reduce network traffic and make content distribution more efficient and less expensive due to the dynamic creation and maintenance of groups.

C. Computing Device and Computing Environment.

Figure 8:
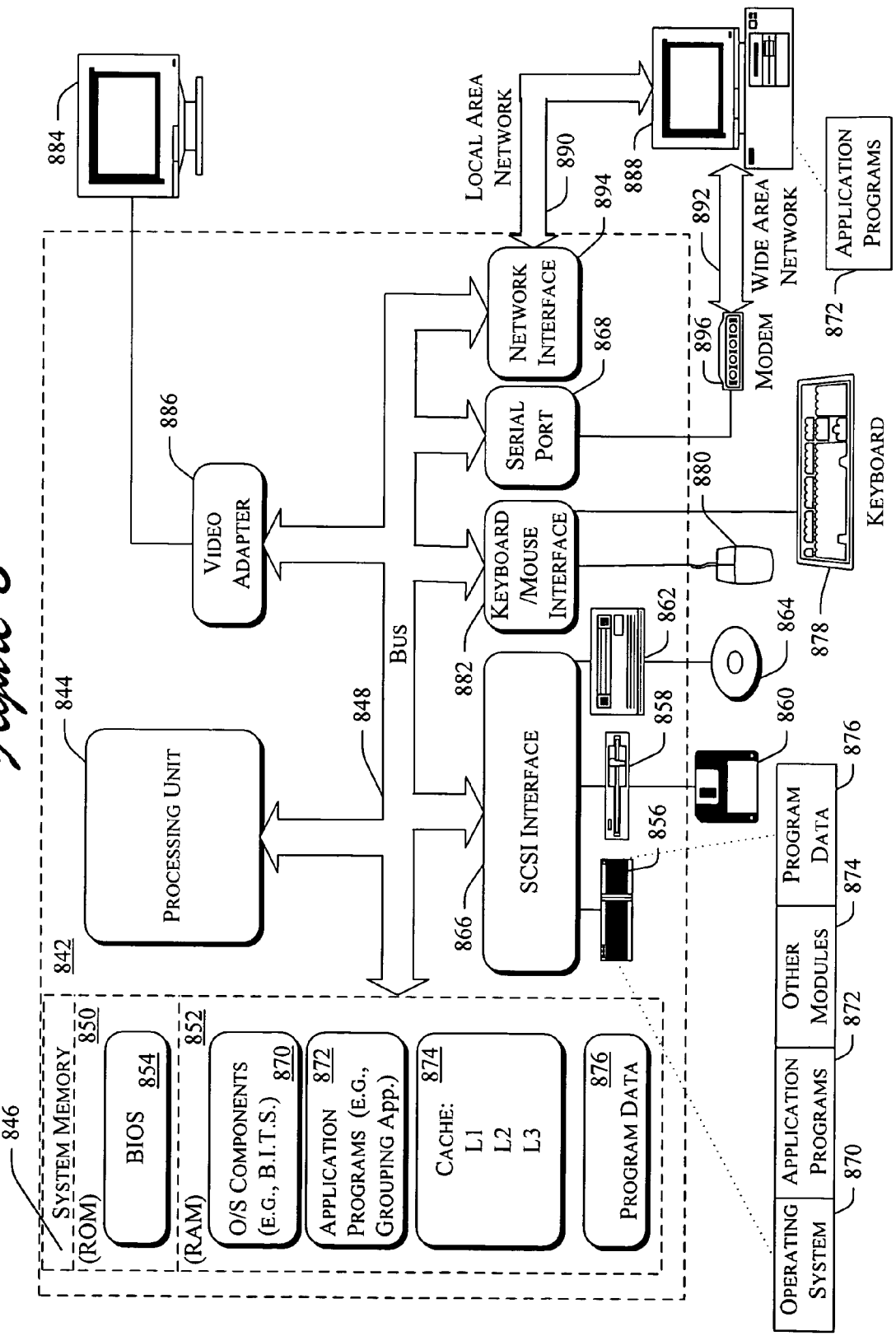
FIG. 8 is a block diagram of both an exemplary related computing device and an exemplary computing environment that can be used to create and manage groups of exemplary related computing devices as discussed in the disclosed exemplary implementations.

FIG. 8 shows an exemplary computing device that can be used to implement the processes described herein. Related computing device 842 includes one or more processors or processing units 844, a system memory 846, and a bus 848 that couples various system components including the system memory 846 to processors 844. The bus 848 represents one or more of any of several types of bus structures, including a memory bus or memory controller, a peripheral bus, an accelerated graphics port, and a processor or local bus using any of a variety of bus architectures. The system memory 846 includes read only memory (ROM) 850 and random access memory (RAM) 852. A basic input/output system (BIOS) 854, containing the basic routines that help to transfer information between elements within related computing device 842, such as during start-up, is stored in ROM 850.

Related computing device 842 further includes a hard disk drive 856 for reading from and writing to a hard disk (not shown), a magnetic disk drive 858 for reading from and writing to a removable magnetic disk 860, and an optical disk drive 862 for reading from or writing to a removable optical disk 864 such as a CD ROM or other optical media. The hard disk drive 856, magnetic disk drive 858, and optical disk drive 862 are connected to the bus 848 by an SCSI interface 866 or some other appropriate interface. The drives and their associated computer-readable media provide nonvolatile storage of computer-readable instructions, data structures, program modules and other data for related computing device 842. Although the exemplary environment described herein employs a hard disk, a removable magnetic disk 860 and a removable optical disk 864, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 856, magnetic disk 860, optical disk 864, ROM 850, or RAM 852, including an operating system (O/S) 870, one or more application programs 872 (such as an application to create and/or manage groups of related computing devices in a domain), cache/other modules 874, and program data 876. Alternatively, O/S 870 can include a component that can create and/or manage groups of related computing devices in a domain, such as is described with respect to O/S 104($m$) seen in FIG. 1. The various levels of cache 874 (e.g., L1, L2, L3) can include shared directories, data, software, and/or computing tasks for distribution to other related computing devices within a group.

A user may enter commands and information into related computing device 842 through input devices such as a keyboard 878 and a pointing device 880. Other input devices (not shown) may include a microphone, joystick, game pad, satellite dish, scanner, or the like. These and other input devices are connected to the processing unit 844 through an interface 882 that is coupled to the bus 848. A monitor 884 or other type of display device is also connected to the bus 848 via an interface, such as a video adapter 886. In addition to the monitor, personal computers typically include other peripheral output devices (not shown) such as speakers and printers.

Related computing device 842 commonly operates in a networked environment using logical connections to one or more remote computers, such as a remote computer 888. The remote computer 888 may be another personal computer, a server, a router, a network PC, a peer device or other common network node, and typically includes many or all of the elements described above relative to related computing device 842. The logical connections depicted in FIG. 8 include a local area network (LAN) 890 and a wide area network (WAN) 892. Such networking environments are commonplace in offices, enterprise-wide computer networks, intranets, and the Internet.

When used in a LAN networking environment, related computing device 842 is connected to the local network through a network interface or adapter 894. When used in a WAN networking environment, related computing device 842 typically includes a modem 896 or other means for establishing communications over the wide area network 892, such as the Internet. The modem 896, which may be internal or external, is connected to the bus 848 via a serial port interface 868. In a networked environment, program modules depicted relative to the personal related computing device 842, or portions thereof, may be stored in the remote memory storage device. It will be appreciated that the network connections shown are exemplary and other means of establishing a communications link between the computers may be used.

Generally, the data processors of related computing device 842 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

General reference is been made herein to one or more related computing devices, such as related computing device 842. As used herein, "related computing device" means any electronic device having data communications, data storage capabilities, and/or functions to process signals, such as broadcast signals, received from any of a number of different sources. For example, a related computing device can be a video game console, a set top box, an automatic teller machine, a PDA, a PC, a cellular telephone, a peripheral computing device such as a printer, facsimile machine, copier, or multifunction peripheral device, a server, etc.

Related computing device 842 can include a variety of computer readable media identified as communication media. Communication media typically embodies computer readable instructions, data structures, program modules, or other data on an information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data defined on any information delivery media.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   transmitting a query by a computing device in a domain;
   receiving, by the computing device, a response to the query from one or more neighbor-casting (NC) groups in the domain each including one or more said computing devices;
   applying, by the computing device, a predetermined criteria to select one NC group, wherein the predetermined criteria is selected from the group comprising:
      the number of said computing devices in the selected NC group;
      a length of time between the query and the response from the selected NC group; and
      a combination of the foregoing;
   joining the computing device to the selected NC group; and
   when a length of time between a subsequent query from the computing device and other computing devices in the selected NC group exceeds a predetermined threshold:
      removing the computing device from the initial NC group;
      reapplying the predetermined criteria to select a different NC group; and
      joining the computing device to the different NC group.

2. The method as defined in claim 1, wherein each said NC group has an identifier that is unique to other said NC groups in the domain.

3. The method as defined in claim 1, wherein each said computing device is selected from among a video game console, a set top box, an automatic teller machine, a Personal Digital Assistance (PDA), a Personal Computer (PC), a cellular telephone, a printer, a facsimile machine, a copier, a multifunction peripheral device, and a server.

4. The method as defined in claim 1, wherein each said response to the query is transmitted by one said computing device in a respective said NC group.

5. The method as defined in claim 1, wherein the query is transmitted over a TCP network with a broadcast or multicast.

6. The method as defined in claim 1, wherein the predetermined criteria to select one said NC group ignores each said response from any said NC group for which the length of time between the query and the response exceeds a predetermined maximum.

7. The method as defined in claim 1, wherein:
   each said response includes the number of computing devices in the responding said NC group; and
   the predetermined criteria to select one said NC group ignores any said NC group for which the response includes the number of computing devices in the responding said NC group that exceeds a predetermined maximum.

8. The method as defined in claim 7, wherein each said response includes an identifier that is unique to the responding said NC group in the domain.

9. The method as defined in claim 1, wherein one or more of the transmitting, the receiving, the applying, and the joining are executed by a component of an operating system of the computing device that is joined to the selected NC group.

10. The method as defined in claim 9, wherein each of the transmitting, the receiving, the applying, and the joining are executed by the operating system of the computing device joined to the selected NC group.

11. The method as defined in claim 1, wherein one or more of the transmitting, the receiving, the applying, and the joining are executed by an application that is running on the computing device joined to the selected NC group.

12. The method as defined in claim 1, wherein the applying further comprises determining at least one of:
   a closest said NC group for which the corresponding response was first to be received; and
   a smallest said NC group that has the least number of the computing devices from among those said NC groups for which the response was received.

13. The method as defined in claim 12, wherein the applying further comprises selecting the one said NC group to be the smallest said NC group when the closest said NC group is more than one said NC group.

14. The method as defined in claim 1, wherein the applying further comprises ordering said NC groups for which a corresponding said response was received according to:
   the length of time between the query and the corresponding response; and
   a number that quantifies the computing devices in the corresponding NC group as is contained in the corresponding response.

15. The method as defined in claim 14, wherein:
   the predetermined criteria to select one said NC group ignores each said response from any said NC group for which the length of time between the query and the response exceeds a predetermined maximum; and
   the selected NC group is selected by a condition that is selected from the group consisting of:
   the length of time between the query and the corresponding response is least;
   the number of said computing devices contained in the corresponding response is least; and
   the number of members contained in the corresponding response is least when more than one said NC group had the least length of time between the query and the corresponding response.

16. A computer storage media comprising instructions that, when executed by a computer, performs the method of claim 1.

17. A method comprising:
   transmitting a query by an initial computing device in a domain, wherein the initial computing device is in an initial NC group that contains a number of computing devices that are also in the domain;
   receiving, by the initial computing device, a response to the query from one or more NC groups in the domain each including one or more computing devices;
   if a latency in response times between the initial computing device and other computing devices within the initial NC group is unacceptable, then:
   applying, by the computing device, predetermined criteria to select one of the one or more NC groups, wherein the predetermined criteria is selected from the group comprising:
   the number of said computing devices in the selected NC group;
   a length of time between the query and the response from the selected NC group; and
   a combination of the foregoing;
   removing the initial computing device from the initial NC group; and
   joining the initial computing device to the selected NC group, wherein computing devices within the selected NC group have a latency in response time with the initial computing device that is acceptable.

18. The method as defined in claim 17, wherein each said NC group has an identifier that is unique to other said NC groups in the domain.

19. The method as defined in claim 17, wherein each said computing device is selected from among a video game console, a set top box, an automatic teller machine, a PDA, a PC, a cellular telephone, a printer, a facsimile machine, a copier, a multifunction peripheral device, and a server.

20. The method as defined in claim 17, wherein each said response to the query is transmitted by one said computing device in a respective said NC group.

21. The method as defined in claim 17, wherein the query is transmitted over a TCP network with a broadcast or multicast.

22. The method as defined in claim 17, wherein the predetermined criteria to select one said NC group ignores each said response from any said NC group for which the length of time between the query and the response exceeds a predetermined maximum.

23. The method as defined in claim 17, wherein:
   each said response includes the number of computing devices in the responding said NC group; and
   the predetermined criteria to select one said NC group ignores any said NC group for which the response includes the number of computing devices in the responding said NC group that exceeds a predetermined maximum.

24. The method as defined in claim 23, wherein each said response includes an identifier that is unique to the responding said NC group in the domain.

25. The method as defined in claim 17, wherein one or more of the transmitting, the receiving, the applying, and the joining are executed by a component of an operating system of the initial computing device.

26. The method as defined in claim 25, wherein each of the transmitting, the receiving, the applying, and the joining are executed by the operating system of the initial computing device.

27. The method as defined in claim 17, wherein one or more of the transmitting, the receiving, the applying, and the joining are executed by an application that is running on the initial computing device.

28. The method as defined in claim 17, wherein the applying further comprises determining at least one of:
   a closest said NC group for which the corresponding response was first to be received; and
   a smallest said NC group that has the least number of the computing devices from among those said NC groups for which the response was received.

29. The method as defined in claim 28, wherein the applying further comprises selecting the one said NC group to be the smallest said NC group when the closest said NC group is more than one said NC group.

30. The method as defined in claim 17, wherein the applying further comprises ordering said NC groups for which a corresponding said response was received according to:
   the length of time between the query and the corresponding response; and a number quantifying the computing devices in the corresponding NC group as is contained in the corresponding response.

31. The method as defined in claim 30, wherein:
the predetermined criteria to select one said NC group ignores each said response from any said NC group for which the length of time between the query and the response exceeds a predetermined maximum; and
the selected NC group is selected by a condition that is selected from the group consisting of:
the length of time between the query and the corresponding response is least; a number of said computing devices in the corresponding NC group as contained in the corresponding response is least; and
the number of members contained in the corresponding response is least when more than one said NC group had the least length of time between the query and the corresponding response.

32. A computer storage media comprising instructions that, when executed by a computer, performs the method of claim 17.

33. A method comprising:
transmitting a query by an initial computing device in a domain, wherein the computing device is in an initial NC group that contains a number of said computing devices in the domain;
receiving by the initial computing device a group response to the query from one or more related said computing devices that are in the initial NC group;
when a length of time between the query and each group response exceeds a predetermined threshold:
applying, by the initial computing device, a predetermined criteria to select one said NC group other than the initial NC group, wherein the predetermined criteria is selected from the group comprising:
the number of said computing devices in the selected NC group;
a length of time between the query and the group response from the selected NC group; and
a combination of the foregoing;
removing the initial computing device from the initial NC group; and
joining the initial computing device to the selected NC group.

34. The method as defined in claim 33, wherein removing the initial computing device from the initial NC group is done according to a predetermined criteria which includes a length of time between the query and the group response.

35. A computer storage media comprising instructions that, when executed by a computer, performs the method of claim 33.

36. A method comprising:
transmitting a query by an initial computing device in a domain, wherein the initial computing device is in an initial NC group that contains a number of computing devices in the domain;
receiving by the initial computing device:
a group response to the query from one or more related computing devices that are in the initial NC group; and
an other group response to the query from one or more NC groups in the domain each including one or more computing devices;
when a length of time between the query and each said group response exceeds a predetermined threshold:
applying, by the initial computing device, a predetermined criteria to select one said NC group other than the initial NC group, wherein the predetermined criteria is selected from the group consisting of:
the number of said computing devices in the selected NC group;
a length of time between the query and the other group response from the selected NC group; and
a combination of the foregoing;
removing the initial computing device from the initial NC group; and
joining the initial computing device to the selected NC group; and
updating software on computing devices in the selected NC group, wherein the updating comprises deploying software, uninstalling software, and providing security patches to installed software, and wherein the software updating includes setting the predetermined criteria to locate computing devices within the selected NC group according to backup needs of computing devices within the NC group.

37. The method as defined in claim 36, wherein:
the predetermined criteria to select one said NC group ignores each said other group response from any said NC group for which the length of time between the query and the other group response exceeds a predetermined maximum; and
the selected NC group is selected by a condition that is selected from the group consisting of:
the length of time between the query and the corresponding other group response is least; or
a number of said computing devices in the corresponding NC group as in contained in the corresponding other group response is least; and
the number of members as contained in the corresponding other group response is least when more than one said NC group had the least length of time between the query and the corresponding other group response.

38. A computer storage media comprising instructions that, when executed by a computer, performs the method of claim 36.

* * * * *